3,840,613
PARAFFIN ALKYLATION WITH OLEFIN USING HIGHLY ACTIVE CRYSTALLINE ZEOLITE CATALYST
Paul E. Eberly, Jr., and Charles N. Kimberlin, Jr., Baton Rouge, La., assignors to Esso Research and Engineering Company, Linden, N.J.
No Drawing. Filed Dec. 29, 1971, Ser. No. 213,722
Int. Cl. C07c 3/52
U.S. Cl. 260—683.43       10 Claims

ABSTRACT OF THE DISCLOSURE

Process for alkylation of paraffin hydrocarbons with olefins by reaction in the presence of a crystalline aluminosilicate zeolite catalyst activated by the sequential steps of ion exchange, steaming, reexchange and calcination.

---

The alkylation of various hydrocarbons has been known to result in the preparation of valuable products. For example, alkylated aromatic hydrocarbons boiling in the naphtha range are capable of imparting a high degree of antiknock capability when they are blended into gasolines. Alkylated aromatics are also in demand for use in the petrochemical and chemical industries. Paraffin alkylate, on the other hand, is added to motor gasoline to control front end quality and overall sensitivity.

Alkylation is presently carried out as a catalytic reaction using strong liquid acids to provide the necessary carbonium ions. These include sulfuric acid and hydrogen fluoride. These prior art catalysts are corrosive, do not provide high yields of alkylate, and require special care and procedures in unit operations.

It has been suggested in recent literature and patents that solid crystalline aluminosilicate zeolite catalysts may be effective for such alkylation of hydrocarbons with alkylating agents such as olefin hydrocarbons. This approach would provide a simplified process characterized by ease of product separation—see U.S. Pat. No. 2,904,607, issued Sept. 15, 1959.

We have found that the activity of zeolite catalysts for alkylation can be improved by employing a particular treating or activation technique. Briefly stated, the treating comprises the sequential steps of (a) removing sodium or other alkali metal ions from the zeolite by ion exchange, (b) steaming, (c) reexchanging and (d) calcining. Catalysts treated in this manner are exceptional alkylation catalysts. Further details of the invention are included in the following description and examples.

Suitable crystalline aluminosilicate zeolites that can be treated to provide active catalysts include natural and synthetic materials having a pore size in the range of 5 to 15 A. within an ordered internal structure. The preparation of synthetic zeolites is well documented in the prior art—see U.S. Pat. No. 2,971,903 and/or Reissue Pat. No. 26,188, for example. Suitable natural crystalline zeolites are exemplified by the minerals faujasite and mordenite. Synthetically prepared zeolites are preferred in the present invention and they are exemplified by such materials as synthetic faujasite, synthetic mordenite, Zeolite X, Zeolite Y, Zeolite L and the like. Usually the zeolites are prepared in the alkali metal (sodium) form and they are rendered more active by ion-exchange with polyvalent cations such as calcium, magnesium, zinc, rare earth metals and the like. Ion exchange with ammonium ions followed by thermal treatment provides a crystalline aluminosilicate in the hydrogen form. The most preferred activated zeolites for use in the alkylation process of the invention are hydrogen faujasite and rare earth faujasite. The zeolites can be used in the pure form or they can be combined with a suitable support or binder. A silica alumina gel matrix containing the zeolite is a preferred form of catalyst.

The process of the invention is applicable to the alkylation of various types of hydrocarbons, including paraffins, isoparaffins, and liquid aromatic compounds, such as aromatic hydrocarbons. The iso or branched chain paraffins which may be alkylated in the present process include isoparaffins having 4–6 carbon atoms in the molecule. Examples of monocyclic aromatic hydrocarbons which may be alkylated by this process include benzene, toluene, ortho-xylene, para-xylene, meta-xylene, ethylbenzene, n-propylbenzene, isopropylbenzene, hexylbenzene, nonylbenzene, dodecylbenzene and mixtures thereof. The process is also applicable to aromatic hydrocarbons containing two or more aryl groups such as diphenyl, diphenylmethane, fluorene and stilbene and to condensed ring aromatic hydrocarbons such as naphthalene and alkyl naphthalenes. The most preferred aromatic hydrocarbons are benzene and monocyclic aromatic hydrocarbons containing 1–3 alkyl groups having 1–10 carbon atoms in the alkyl chain.

The alkylating agent which is utilized can be an olefin hydrocarbon or a material which produces or acts as an olefin under reaction conditions. Thus, monoolefins, diolefins, polyolefins, alkyl halides, alcohols, ethers and esters can be used. The preferred alkylating agents, particularly when alkylating aromatics, are olefin hydrocarbons containing one double bond per molecule. Specific examples include ethylene, propylene, 1-butene, 2-butene, isobutylene, pentenes, hexenes, heptenes, propylene trimer, propylene tetramer and mixtures thereof. Olefins can also be obtained from refinery streams containing these olefins. Olefins containing 2–4 carbon atoms are the most preferred alkylating agents for alkylating aromatic hydrocarbons, and monoolefins containing 2–6 carbon atoms in the molecule, such as ethylene, propylene and butylene are most preferred for alkylating isoparaffins.

The reaction is generally carried out in a stirred batch type, or fixed bed, reactor by contacting or passing the olefins and hydrocarbons to be alkylated over the activated catalysts at temperatures ranging from ambient up to about 600° F., and preferably at from about ambient to the boiling point of the mixture, at atmospheric or subatmospheric pressures, and preferably at autogenous pressure. The preferred pressure is 15 to 100 p.s.i.a. From about 0.1 to about 10, and preferably from about 0.5 to about 6, weight parts of olefin, per hour, per weight part of catalyst (w./hr./w.) is introduced into the reactor; and in introducing the hydrocarbons to be alkylated and the olefins into the reactor, molar ratios of the hydrocarbon to olefin ranging from 1:1 to about 15:1, and preferably from about 5:1 to about 10:1, are desired in the case of aromatic alkylation; and molar ratios of the hydrocarbon to olefin ranging from 5:1 to about 100:1, and preferably from about 10:1 to about 50:1 are desired in the case of paraffin alkylation, to minimize the reaction between the olefin or olefins. Following separations, unreacted materials are recycled and the desired products are recovered.

The zeolite catalyst is activated for alkylation in the following general manner:

A. The original synthetic or naturally occurring zeolite generally containing a considerable portion of alkali metal cations such as sodium is treated with an aqueous solution of an ammonium salt such as the nitrate or chloride in an appropriate manner to remove 50 to 98% of the alkali metal cations by exchange with the $NH_4^+$ ions. This treatment can be carried out by one or a number of successive exchange steps. Preferably, the exchange is conducted to remove 80 to 95% of the alkali metal cations. For example, with sodium faujasite a level of 2 to 5% $Na_2O$ is desirable.

B. Following Step A, the material is heated in the presence of water vapor to elevated temperatures in the range of 600° to 1200° F. for periods of time ranging from 1 to 16 hours or more. In a preferred embodiment, the material from Step A is heated in about 1 atmosphere of steam for about 2 hours at temperatures from 900° to 1100° F. Not all the processes that occur in this steaming step are fully understood. It is known, however, that $NH_3$ gas is liberated, leaving behind a hydrogen-form of the zeolite. More extensive changes also occur such as removal of physically absorbed water as well as partial removal of structural OH groups. The unit cell of the crystal generally is observed to decrease and the residual alkali metal ions are so rearranged as to make them more accessible to removal by further exchange. It is to be understood that although desirable, it may not be altogether necessary to add additional water for steaming since a portion of the water could result from residual water left in the filter cake after Step A.

C. After the steaming step, the zeolite is further treated with an ammonium salt solution as described in Step A. The treatment is conducted in such a manner as to reduce the alkali metal content to a level of 0.02 to 1.0% by weight. Preferably, the level lies between 0.02 and 0.5%. One or more successive exchanges may be necessary to accomplish this removal. Ammonium salts are generally preferred for this exchange but it is also within the scope of this invention to include other agents such as mineral acids to accomplish this step. In a preferred embodiment, this final ammonium exchange is conducted at a pH of 3 to 5 which is kept in this range by addition of a mineral or acetic acid.

D. The product from Step C is then calcined in air at elevated temperatures to remove a considerable portion of the loosely held water and to liberate $NH_3$ by decomposing the $NH_4^+$ ions. This calcination is carried out at 700° to 1200° F. for periods of 1 to 16 hours or more. Preferably, the material is calcined for 3 hours at 800° F.

The following examples demonstrate the superiority of the activated catalyst for alkylation of hydrocarbons.

EXAMPLE 1

$NH_4$ faujasite containing 2.97% $Na_2O$ was calined in air for 3 hours at 1000° F. A portion weighing 1.178 g. was added to 10 cc. of research grade benzene. The mixture was stirred to a slurry at ambient temperature and propylene gas passed through at a rate of 50 cc./min. At various intervals the addition was stopped and a small sample withdrawn for gas chromatographic analysis. Results are given below in Table I where the percent alkylation represents the percent of alkylate in the liquid phase.

TABLE I

Propylene Alkylation of Benzene

| Time, Hr.: | Percent Alkylation per Gram Catalyst |
|---|---|
| 0.25 | 19.1 |
| 0.50 | 25.4 |
| 1.0 | 26.9 |
| 1.5 | 28.5 |
| 2.0 | 29.9 |

EXAMPLE 2

$NH_4$ faujasite containing 2.97% $Na_2O$ was calcined in air for 3 hours at 800° F. A portion weighing 3.1901 grams was placed in an autoclave. 100 liquid cc. of isobutane was added to the solid and a pressure of 375 p.s.i. $N_2$ placed on the system. The autoclave was heated to 200° F. and a feed mixture consisting of 10 moles isobutane to 1 mole cis-butene-2 was added to the autoclave at a rate of 0.4 cc./min. Analyses were made at various times and results are recorded below.

TABLE II

| Time, hrs. | Percent of total $C_4H_8$ which was reacted | Alkylate product, percent | | | Percent TMP (tri-methyl-pentane) in $C_8$ | Percent alkyla-tion |
|---|---|---|---|---|---|---|
| | | $C_5$–$C_7$ | $C_8$ | $C_9^+$ | | |
| 0.5 | 40 | 29 | 14 | 7 | 50 | 12.8 |
| 1 | 60 | 34 | 57 | 9 | 50 | 17.1 |
| 2 | 50 | 27 | 59 | 14 | 40 | 11.8 |
| 3 | 30 | 30 | 58 | 12 | 35 | 6.1 |

The percent alkylation tabulated in the last column is equal to $$\frac{(\text{percent } C_4H_8 \text{ reacted})}{100} \times \frac{(\text{percent } C_8)}{100} \times (\text{percent TMP in } C_8).$$

This number is designed to reflect overall performance of the catalyst. The percent TMP (trimethylpentane) in the $C_8$ fraction represents the amount of true alkylation with respect to olefin dimerization.

EXAMPLE 3

$NH_4$ faujasite containing 2.97% $Na_2O$ was steamed at one atmosphere pressure for 2 hours at 1050° F. This material was then exchanged with $NH_4NO_3$ solutions at a pH of 3 which was controlled by addition of acetic acid. The soda content of the resultant material was 0.31 weight percent. The faujasite was calcined for 3 hours at 1000° F. A portion weighing 1.0875 g. was added to 10 cc. of research grade benzene. The mixture was stirred to a slurry at ambient temperature and propylene gas passed through at a rate of 50 cc./min. At various intervals the addition was stopped and a small sample withdrawn for gas chromatographic analysis. Results are given below where the percent alkylation represents the percent alkylate in the liquid phase.

TABLE III

Propylene Alkylation of Benzene

| Time, Hr.: | Percent Alkylation per Gram Catalyst |
|---|---|
| 0.25 | 24.2 |
| 0.50 | 45.6 |
| 1.0 | 56.5 |
| 1.5 | 60.7 |
| 2.0 | 65.2 |

EXAMPLE 4

$NH_4$ faujasite containing 2.97% $Na_2O$ was steamed at one atmosphere pressure for 2 hours at 1050° F. This material was then exchanged with $NH_4NO_3$ solutions at a pH of 3 which was controlled by addition of acetic acid. The soda content of the resultant material was 0.31 weight percent. The faujasite was calcined for 3 hours at 800° F. A portion weighing 3.0467 grams was placed in an autoclave. 100 cc. of liquid isobutane was added to the solid and a pressure of 275 p.s.i. $N_2$ placed on the system. The autoclave was heated to 200° F. and a feed mixture consisting of 10 moles isobutane to 1 mole cis-butene-2 was added to the autoclave at a rate of 0.4 cc./min. Analyses were made at various times and results are recorded below.

TABLE IV

| Time, hrs. | Percent of total $C_4H_8$ which was reacted | Alkylate product, percent | | | Percent TMP (tri-methyl-pentane) in $C_8$ | Percent alkyla-tion |
|---|---|---|---|---|---|---|
| | | $C_5$–$C_7$ | $C_8$ | $C_9^+$ | | |
| 0.5 | 100 | 34 | 50 | 16 | 95 | 47.5 |
| 1 | 96 | 36 | 60 | 4 | 95 | 57.7 |
| 2 | 94 | 29 | 51 | 16 | 95 | 45.5 |
| 3 | 85 | 37 | 61 | 2 | 85 | 48.1 |

The quantities have the same significance as in Example 2. The amount of olefin reacted at any given time is much greater on this exchanged, steamed, reexchanged and calcined faujasite. Also, the percent TMP in $C_8$ is much higher, indicating more true alkylation. The overall performance as measured by percent alkylation is three to more than four fold greater.

EXAMPLE 5

A sample of LaH faujasite (lanthanum hydrogen faujasite) containing 2.59% $Na_2O$ was calcined 3 hours in air at 1000° F. A portion weighing 1.1661 g. was added to 10 cc. of research grade benzene. The mixture was stirred to a slurry at ambient temperature and propylene gas passed through at a rate of 50 cc./min. At various intervals the addition was stopped and a small sample withdrawn for analysis. Results are given below where the percent alkylation represents the percent alkylate in the liquid phase.

TABLE V

Propylene Alkylation of Benzene

| Time, Hr.: | Percent Alkylation per Gram Catalyst |
|---|---|
| 0.25 | 23.9 |
| 0.50 | 28.8 |
| 1.00 | 30.8 |
| 1.50 | 34.0 |
| 2.00 | 39.0 |

EXAMPLE 6

A sample of LaH faujasite (lanthanum hydrogen faujasite) containing 2.59% $Na_2O$ was calcined 3 hours in air at 800° F. A portion weighing 3.5300 grams was placed in an autoclave. 100 cc. of liquid isobutane was added to the solid and a pressure of 275 p.s.i. $N_2$ placed on the system. The autoclave was heated to 200° F. and a feed mixture consisting of 10 moles isobutane to 1 mole cis-butene-2 was added to the autoclave at a rate of 0.4 cc./min. Analyses were made at various times and results are recorded below.

TABLE VI

| Time, hrs. | Percent of total $C_4H_8$ which was reacted | Alkylate product, percent | | | Percent TMP (trimethyl-pentane) in $C_8$ | Percent alkylation |
|---|---|---|---|---|---|---|
| | | $C_5$-$C_7$ | $C_8$ | $C_9^+$ | | |
| 0.5 | | 45 | 50 | 5 | 95 | |
| 1 | 90 | 41 | 53 | 6 | 96 | 45.3 |
| 2 | 85 | 43 | 50 | 7 | 95 | 40.9 |
| 3 | 85 | 47 | 43 | 10 | 95 | 34.7 |

EXAMPLE 7

$NH_4$ faujasite containing 2.97% $Na_2O$ was steamed at one atmosphere pressure for 2 hours at 1050° F. This material was then exchanged with $NH_4NO_3$ solution at a pH of 3 which was controlled by addition of acetic acid. The soda content of the resultant material was 0.31 weight percent. The zeolite was then further exchanged with $LaCl_3$ to produce a material containing 0.19% $Na_2O$. This was calcined for 3 hours in air at 1000° F. A portion weighing 1.1369 grams was added to 10 cc. of research grade benzene. The mixture was stirred to a slurry at ambient temperature and propylene gas passed through at a rate of 50 cc./min. At various intervals the addition was stopped and a small sample withdrawn for analysis. Results are shown below where the percent alkylation represents the percent alkylate in the liquid phase.

TABLE VII

Propylene Alkylation of Benzene

| Time, Hr.: | Percent Alkylation per Gram Catalyst |
|---|---|
| 0.25 | 22.4 |
| 0.50 | 43.9 |
| 1.00 | 54.1 |
| 1.50 | 58.2 |
| 2.0 | 64.5 |

EXAMPLE 8

The same $NH_4$-steamed-$NH_4$ exchanged-$LaCl_3$ (0.19 wt. percent) exchanged faujasite used in Example 7 was again employed, but this time was calcined for 3 hours in air at 800° F. A portion weighing 3.3669 grams was placed in an autoclave. 100 cc. of liquid isobutane was added to the solid and a pressure of 275 p.s.i. $N_2$ placed on the system. The autoclave was heated to 200° F. and a feed mixture consisting of 10 moles isobutane to 1 mole cis-butene-2 was added to the autoclave at a rate of 0.4 cc./min. Analyses were made at various times and results are recorded below.

TABLE VIII

| Time, hrs. | Percent of total $C_4H_8$ which was reacted | Alkylate product, percent | | | Percent TMP (trimethyl-pentane) in $C_8$ | Percent alkylation |
|---|---|---|---|---|---|---|
| | | $C_5$-$C_7$ | $C_8$ | $C_9^+$ | | |
| 1 | 100 | 34 | 63 | 3 | 95 | 59.9 |
| 2 | 98 | 41 | 57 | 2 | 95 | 53.1 |
| 3 | 95 | 43 | 55 | 2 | 95 | 49.6 |

Thus, the alkylation process disclosed and claimed herein provides the desirable feature of a solid alkylation catalyst capable of producing high yields of alkylated paraffins.

Comparing Example 1 with Example 3, it can be seen that when the ammonium faujasite catalyst is steamed, reexchanged and calcined, 65.2% alkylate is produced compared to 29.9% when ammonium faujasite is merely calcined. Comparing Example 5 with Example 7, similar results are obtained with a rare earth faujasite. It is thus evident from all of the examples that when the present catalysts are activated or treated by the sequential steps of exchange, steaming, reexchange and calcining, superior alkylation is achieved.

The alkylation process disclosed and claimed herein thus provides the desirable feature of a solid alkylation catalyst capable of producing high yields of alkylated hydrocarbons.

What is claimed is:

1. An improved alkylation process which comprises contacting a paraffin-containing hydrocarbon feed with an olefin in the presence of a crystalline aluminosilicate zeolite-containing catalyst which has been activated by the following sequential steps:
   (a) base exchanging said crystalline aluminosilicate zeolite with a solution containing ammonium ions;
   (b) heating the zeolite product of step (a) in the presence of water vapor, at temperatures in the range of 600° to 1200° F;
   (c) base exchanging the zeolite product of step (b) with a solution containing ions selected from the group consisting of ammonium ions, hydrogen ions and mixtures thereof to reduce the alkali metal content to a level of 0.02 to 1.0% by weight; and
   (d) calcining the zeolite product of step (c) in air at elevated temperatures.

2. The process of claim 1 wherein said olefin is selected from the group consisting of ethylene, propylene, butylene and mixtures thereof.

3. The process of claim 1 wherein said crystalline aluminosilicate zeolite is a synthetic faujasite.

4. The process of claim 1 wherein at least 50% alkylated product is recovered therefrom.

5. An improved alkylation process which comprises contacting a paraffin-containing hydrocarbon feed with an olefin in the presence of a crystalline aluminosilicate zeolite-containing catalyst which has been activated by the following sequential steps:
   (a) base exchanging said crystalline aluminosilicate zeolite with a solution containing ammonium ions so as to replace about 50 to 98% of the initial alkali metal content of said zeolite with ammonium ions;

(b) heating the zeolite product of step (a) in an atmosphere containing steam at temperatures in the range of 600° to 1200° F.;

(c) base exchanging the zeolite product of step (b) with a solution containing ions selected from the group consisting of ammonium ions, hydrogen ions and mixtures thereof to reduce the alkali metal content to a level of 0.02 to 1.0% by weight; and (d) calcining the zeolite product of step (c) in air at elevated temperatures of from about 700° to 1200° F.

6. The process of claim 5 wherein said hydrocarbon feed comprises isoparaffins and wherein said olefin comprises a $C_3$–$C_6$ monoolefin.

7. The process of claim 6 wherein said monoolefin comprises butene-2.

8. The process of claim 6 wherein said crystalline aluminosilicate zeolite comprises a faujasite containing an ion selected from the group consisting of rare earth ions, hydrogen ions and mixtures thereof.

9. The process of claim 5 wherein said step (b) is conducted at a temperature of from 900° to 1100° F.

10. The process of claim 5 wherein said step (c) is maintained at a pH of from 3 to 5.

References Cited

UNITED STATES PATENTS

| 3,647,916 | 3/1972 | Caesar et al. | 260—683.43 |
| 3,591,488 | 7/1971 | Eberly, Jr., et al. | 252—455 Z |

DELBERT E. GANTZ, Primary Examiner

G. J. CRASANAKIS, Assistant Examiner

U.S. Cl. X.R.

252—455 Z